US 9,874,286 B2

(12) United States Patent
Bagagli et al.

(10) Patent No.: US 9,874,286 B2
(45) Date of Patent: *Jan. 23, 2018

(54) DIFFERENTIAL PRESSURE VALVE WITH REDUCED SPRING-SURGE AND METHOD FOR REDUCING SPRING SURGE

(76) Inventors: Riccardo Bagagli, Florence (IT); Leonardo Tognarelli, Florence (IT); Carmelo Maggi, Florence (IT); Alberto Babbini, Florence (IT)

(*) Notice: Subject to any disclaimer, the term of this patent is extended or adjusted under 35 U.S.C. 154(b) by 1472 days.

This patent is subject to a terminal disclaimer.

(21) Appl. No.: 13/553,263

(22) Filed: Jul. 19, 2012

(65) Prior Publication Data
US 2013/0019955 A1 Jan. 24, 2013

(30) Foreign Application Priority Data
Jul. 19, 2011 (IT) .................................. FI2011A0143

(51) Int. Cl.
F16K 17/20 (2006.01)
F16K 15/02 (2006.01)
F04B 39/10 (2006.01)
F16K 15/12 (2006.01)

(52) U.S. Cl.
CPC ............ *F16K 15/026* (2013.01); *F04B 39/10* (2013.01); *F16K 15/12* (2013.01); *Y10T 137/0379* (2015.04); *Y10T 137/7738* (2015.04)

(58) Field of Classification Search
CPC ...... F16K 15/026; F16K 15/025; F16K 15/12; Y10T 137/7924; Y10T 137/7929; Y10T 137/7038; Y10T 137/7905; F04B 39/10
USPC ................................ 137/511, 529, 535, 540
See application file for complete search history.

(56) References Cited

U.S. PATENT DOCUMENTS

| 1,742,755 | A | * | 1/1930 | Cataline | F01L 1/462 |
| | | | | | 137/529 |
| 1,818,439 | A | * | 8/1931 | Travis | F16K 15/063 |
| | | | | | 137/543.13 |
| 5,694,977 | A | | 12/1997 | Clark | |
| 9,297,373 | B2 | * | 3/2016 | Bagagli | F04B 39/10 |
| 2003/0051757 | A1 | * | 3/2003 | Roth | F16K 15/046 |
| | | | | | 137/541 |
| 2010/0024891 | A1 | | 2/2010 | Francini et al. | |

FOREIGN PATENT DOCUMENTS

| DE | 3139948 A1 | 4/1983 |
| GB | 1277055 A | 6/1972 |
| JP | 8319973 A | 12/1996 |
| WO | 2011018503 | 2/2011 |

OTHER PUBLICATIONS

IT Search Report from corresponding IT Patent Application FI2011A000143 dated Feb. 17, 2012.

* cited by examiner

*Primary Examiner* — Craig Schneider
*Assistant Examiner* — P. Macade Nichols
(74) *Attorney, Agent, or Firm* — GE Global Patent Operation

(57) ABSTRACT

Disclosed is a differential pressure valve comprising: a valve body, the valve body having at least one flow inlet and one flow outlet: at least one shutter, the shutter being movable between an open position and a closed position under a differential pressure across the valve; at least one flow passage from the flow inlet to the flow outlet; at least one biasing member configured to bias the shutter towards a closed position so as to block the flow passage through the flow inlet. The biasing member is a non-linear biasing member.

18 Claims, 15 Drawing Sheets

STATE OF THE ART

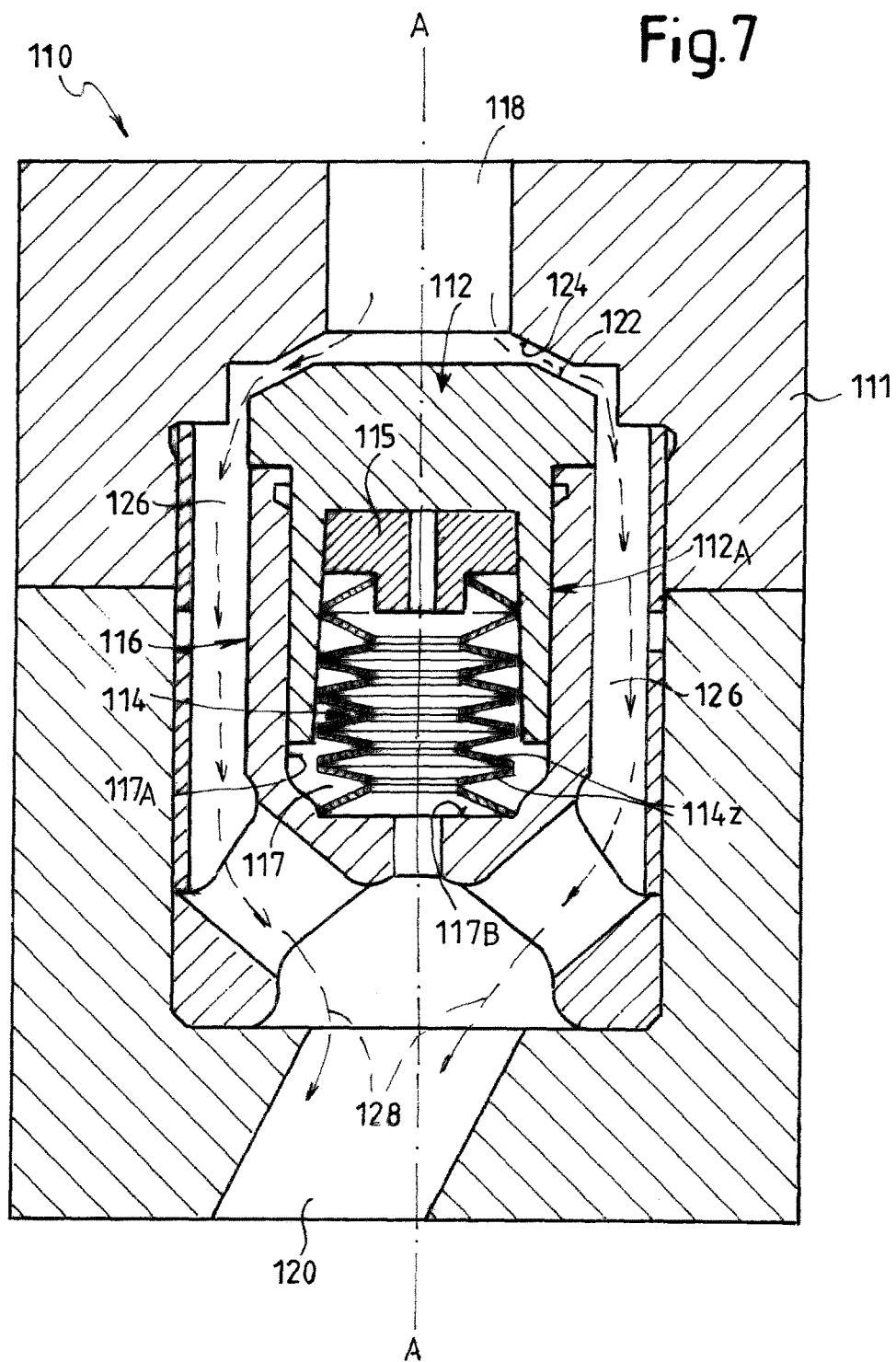

Fig. 8
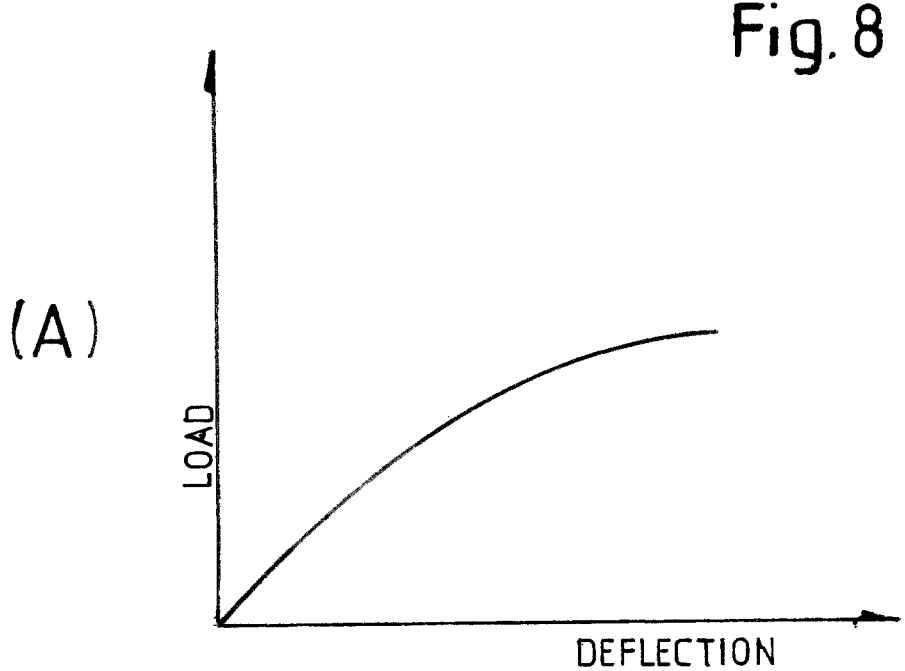
(A)
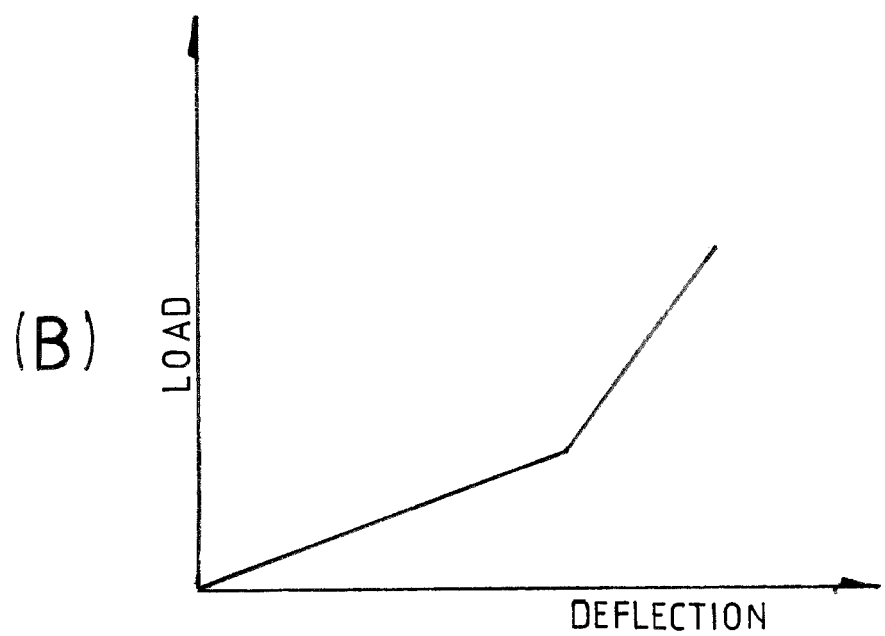
(B)

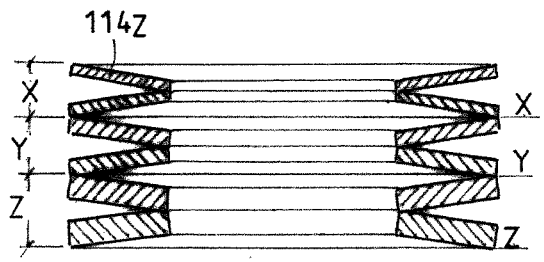
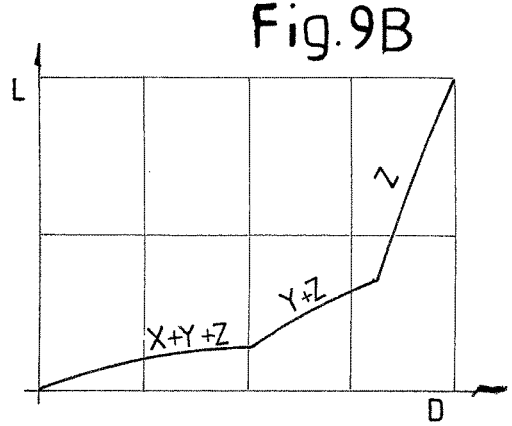
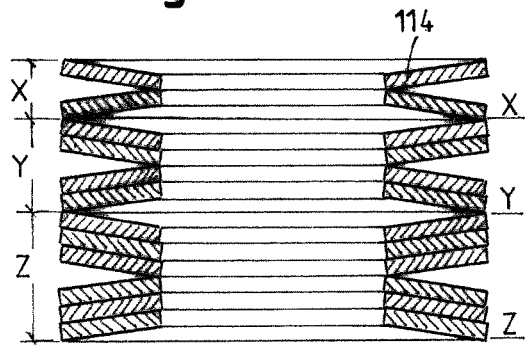
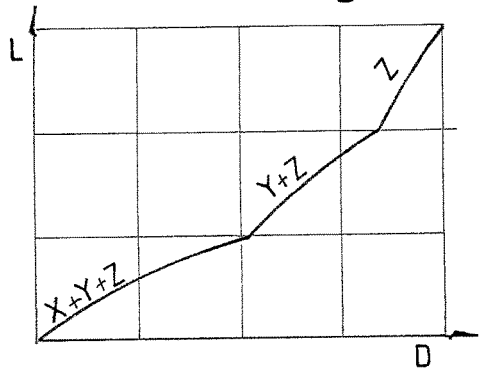
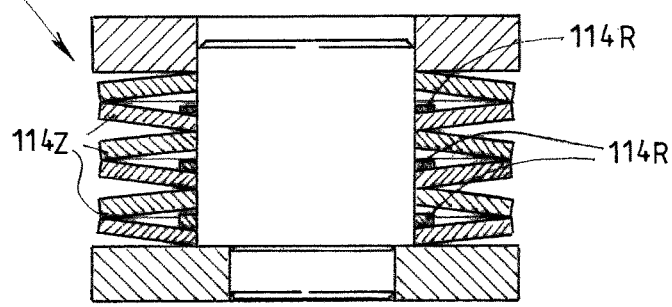

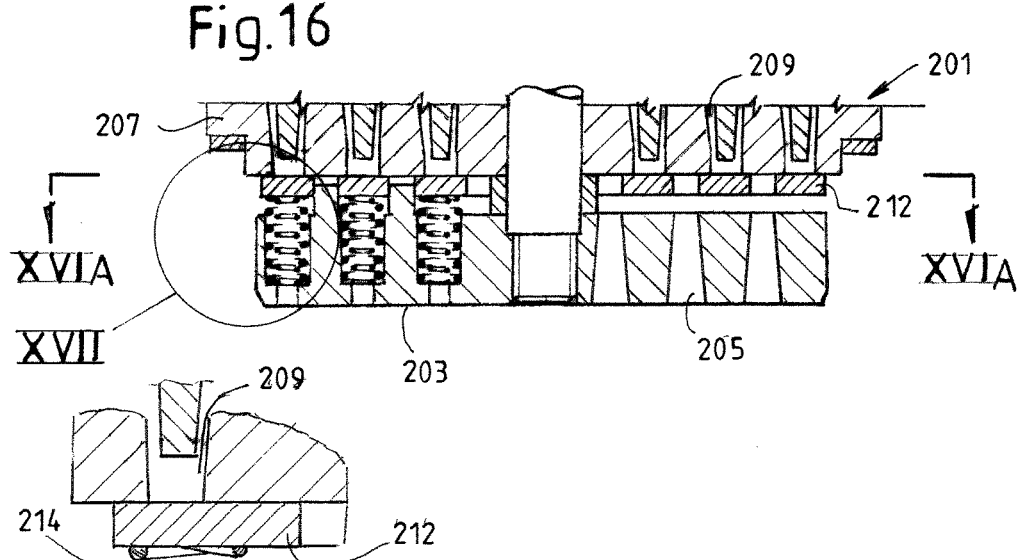
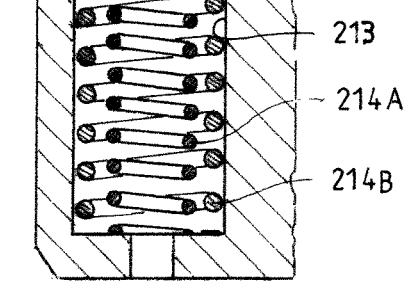
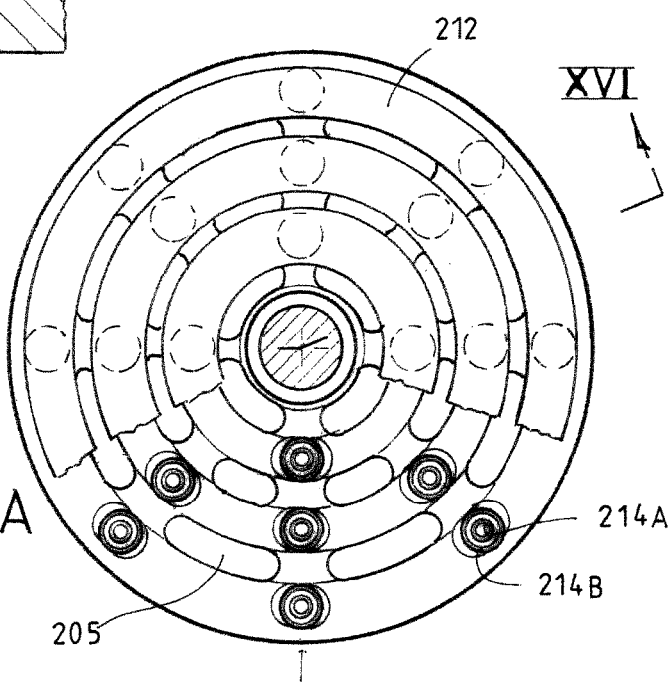

DIFFERENTIAL PRESSURE VALVE WITH REDUCED SPRING-SURGE AND METHOD FOR REDUCING SPRING SURGE

BACKGROUND OF THE INVENTION

The embodiments disclosed relate generally to differential pressure valves, i.e. to valves which are automatically actuated by the pressure difference across the valve. Some exemplary embodiments specifically relate to reciprocating compressor valves, such as in particular to poppet valves or hyper compressors.

Hyper compressors, those capable of producing gas pressure levels up to or above 3,000 bars, are widely used in industrial application, including, but not limited to, the production of low density polyethylene, or LDPE. The efficient performance of these compressors is controlled at least in part by suction and discharge automatic poppet valves. FIG. 1 illustrates a cutaway of a portion of a hyper compressor 2 of the conventional art comprising two poppet valves 10. FIG. 2 illustrates an enlarged section of one of the conventional poppet valves of the compressor shown in FIG. 1, in an opened position. A poppet guide according to the state of the art is disclosed in US-A-2010/0024891.

As shown in FIG. 1, a hyper compressor 2 usually comprises a casing 3 in which a cylinder 4 is formed. A piston rod 5 slides reciprocatingly in the cylinder 4 to suck a fluid from a suction duct 6 and discharge the fluid at a higher pressure in a discharge duct 7. A poppet valve 10 is arranged in each said suction duct 6 and discharge duct 7. In FIG. 1 reference number 10S designates the poppet valve in the suction duct 6 and reference number 10D designates the poppet valve in the discharge duct 7. Each poppet valve 10S, 10D is designed as shown in FIG. 2 and is designated 10 therein.

As shown in FIG. 2, the conventional poppet valve 10 includes a valve body 11 that contains therein a poppet, or poppet shutter, 12 configured to open and close the gas flow path in and out of the hyper compressor 1, a spring 14 configured to keep the poppet shutter 12 in a closed position against a closure seat 13 formed by a portion of the internal surface of the valve body 11, and a shutter guide 16 that contains the poppet shutter 12 and the spring 14. As shown, when the poppet shutter 12 is forced opened, a flow passage 17 (identified by several arrows in FIG. 2) is formed from a flow inlet 18 to a flow outlet 20 of the conventional poppet valve 10, the flow path being defined by the space formed between the poppet shutter 12 and the valve body 11 as well as between the shutter guide 16 and the valve body 11. The shutter guide 16 of the conventional poppet valve 10 further includes a discharge opening 22 along an axis A-A of the shutter guide 16 connecting an inside chamber 26 of the shutter guide 16 to the flow passage 17 in a region of flow stagnation, the back pressure in the inside chamber 26 being defined at least in part by the static pressure in the region of the flow passage 17 around the axis A-A of conventional poppet valve 10.

Opening and closing of the poppet valves 10, 10S, 10D is automatically controlled by differential pressure across the valves. These valves are therefore sometime called "automatic valves" and distinguish over controlled valves, such as those commonly used in internal combustion engines, where valve opening and closing is controlled by an external actuator, such by way of a cam shaft.

The suction poppet valve 10S is arranged such that it opens when the pressure in the cylinder 4 of the hyper compressor 2 diminishes during the suction stroke of the piston rod 5. The pressure in the suction duct 6 overcomes the force of the spring 14; the differential pressure across the valve causes opening of the valve and fluid is sucked in the compressor cylinder 4. The discharge valve 10D is closed. Once the piston rod 5 reaches the bottom dead center, the movement is reversed and compression of the fluid in the cylinder starts. Increased pressure in the cylinder 4 automatically closes the suction valve 10S and opens the discharge valve 10D when the differential pressure across the discharge valve 10D, between the compressor cylinder 4 and the discharge duct 7, overcomes the force of the relevant spring.

At each closing movement the poppet shutter 12 of the relevant poppet valve 10, 10S, 10D strikes violently against the seat 13 of the valve body 11 and each opening stroke causes the poppet shutter 12 to strike against the shutter guide 16.

These poppet valves play an important role in the reliability of hyper compressors used in plants for the production of LDPE. The performance of such valves depends not only on selected material properties and a suitable design to withstand high operating gas pressures, but also on a proper dynamic behavior of the poppet shutter 12. The proper opening and closing of the valve are influenced by various design constraints related to several dynamic forces acting on the valve, including a drag force acting on the poppet shutter 12 and shutter guide 16 to open the valve, this drag force being generated by the interaction of the gas flow with the noted valve parts; a gas pressure force acting on the shutter guide 16 to close the conventional valve 10, this gas pressure force being generated by the flow back pressure acting on a back surface of the shutter guide 16; an inertia force associated with the mass of the poppet shutter 12; and a spring force generated by the spring 14 to close the valve, among others.

Hyper compressors operate usually in a speed range between 150 and 300 rpm. At each cycle all the valves perform an opening and closing movement with corresponding impacts of the poppet shutter against the seat 13 and against the shutter guide 16. Repeated impacts cause impact wear and frontal damages, which eventually lead to poppet failure. Impact wear causes material consumption and surface irregularities that can crate favorite sites for the formation of cracks. These can propagate by impact fatigue due to the stress waves generated by dynamic loads caused by impacts, till final fracture of the poppet shutter. In case of high impact velocities, impact fatigue can nucleate cracks itself, even in the absence of impact wear.

When there are impact loads on the springs, the stress propagates along the spring wire. The end coil of the spring in contact with the applied load takes up whole of the deflection and then it transmits a large part of its deflection to the adjacent coils. This wave of compression travels along the spring indefinitely. Resonance will occur depending upon time traveled. This results in very large deflections and correspondingly very high stresses. Under these conditions, it is just possible that the spring may fail. This phenomenon is called surge. From another view point, an impact stress applied on the spring upon closing or opening of the shutter introduces a deformation of the spring according to a function which can be decomposed in a Fourier series which also includes harmonics corresponding to the resonance frequencies of the spring. Under some circumstance this can generate the above mentioned compression wave traveling along the spring. The high stress induced in the spring by resonance can eventually result in spring failure. If this occurs in an automatic valve of a reciprocating compressor the shutter will continue to operate but under abnormal operating conditions. Impact velocities of the shutter increase to very high values giving rise to frontal damage (impact wear and impact fatigue) of the shutter. Frontal damage generate cracks which rapidly propagate under dynamic stresses produced by repeated impacts till final failure of the valve, when the shutter breaks.

Spring surge can be induced also by gas dynamic forces (vortex shedding). These forces generate pressure oscillations with a frequency typically ranging between 100 and 1200 Hz, corresponding to one or more resonance frequencies of the valve spring.

Automatic valves are used not only in hyper compressors but also in other kinds of reciprocating compressors, commonly used for lower pressure ranges, e.g. between 100 and 1000 bar. These automatic valves comprise a valve stop with one or more outlet apertures and a valve seat with one or more inlet apertures. Disk-shaped or ring-shaped shutters, or valve plates, are arranged between the seat and the counter-seat and are resiliently urged by springs against the valve seat. Opening and closing is controlled by the differential pressure across the valve. These valves are commonly called "ring valves", to indicate the shape of the shutters used therein. Spring surge can arise also in this kind of automatic valves of reciprocating compressors, due to the effect of the impact loads on the spring upon opening and closing of the ring-shaped shutters.

It would therefore be desirable to develop an improved reciprocating-compressor valve, in particular an automatic valve, such as specifically a poppet valve for hyper compressors, where spring surge phenomena are suppressed or at least mitigated.

BRIEF DESCRIPTION OF THE INVENTION

By providing a biasing member having a non-linear behavior, propagation of surge waves along the biasing member is prevented or at least reduced. Should the shutter be subject to a load which contains a frequency equal to the resonance frequency of the biasing member, the latter would tend to resonate with generation of a localized compression of the biasing member. Since the biasing member is non-linear, the resonance frequency will change just as a consequence of triggering a surge wave in the resilient member. Resonating of the biasing member is thus prevented or at least strongly reduced.

In general terms the subject matter disclosed herein concerns a pressure valve, e.g. a differential pressure valve, in particular (but not exclusively) a reciprocating compressor valve, comprising a valve body and a shutter as well as a shutter biasing member, wherein opening and closing of the valve is controlled by differential pressure across the valve, and wherein a surge-reduction arrangement is provided, configured to suppress or mitigate surge phenomena in said biasing member.

Thus, according to one aspect, a differential pressure valve is provided, comprising: a valve body, the valve body having at least one flow inlet and one flow outlet: at least one shutter, the shutter being movable between an open position and a closed position under a differential pressure across the valve; at least one flow passage from the flow inlet to the flow outlet; at least one biasing member configured to bias the shutter towards a closed position so as to block the flow passage through the flow inlet; wherein the biasing member is non-linear.

According to a further aspect, a differential pressure poppet valve is provided. The differential pressure poppet valve comprises a valve body, the valve body having at least one flow inlet and one flow outlet; at least one shutter guide disposed inside the valve body; at least one poppet shutter slidingly guided by the shutter guide; a flow passage from the flow inlet to the flow outlet, the flow passage being formed between an inside surface of the valve body and an outside surface of the shutter guide and of the poppet shutter; at least one biasing member configured to bias the poppet shutter towards a closed position so as to block the flow passage through the flow inlet; and a surge-suppression arrangement configured to suppress or mitigate surge phenomena in the biasing member.

According to another aspect, a method for mitigating or suppressing spring surge in a differential pressure valve is provided. The differential pressure valve comprises: a valve body, the valve body having at least one flow inlet and one flow outlet; at least one shutter, the shutter being movable between an open position and a closed position under a differential across the valve; a flow passage from the flow inlet to the flow outlet: and at least one biasing member configured to bias the shutter towards a closed position so as to block the flow passage through the flow inlet. The method comprises suppressing propagation of resonance compression waves in the biasing member by non-linear deflection of the biasing member.

According to still a further aspect, a method for operating a reciprocating compressor is provided. The compressor comprises a cylinder; a piston sliding in the cylinder; a suction duct with a suction valve and a discharge duct with a discharge valve, each valve comprising at least one shutter. The method comprises providing for each shutter at least one non-linear biasing member configured to bias the shutter toward a closed position; reciprocatingly moving the piston in the cylinder to suck a gas in the cylinder at a suction pressure and discharge the gas from the cylinder at a discharge pressure; and selectively opening and closing the suction valve and the discharge valve by differential pressure across the valves.

In some embodiments the valve is a so-called poppet valve, comprising at least one poppet shutter and at least one shutter guide, in which the shutter is slidingly guided during opening and closing movement thereof. The non-linear biasing member can advantageously be housed in the shutter guide.

According to other embodiments the valve is a ring valve, such as an automatic ring valve for reciprocating compressors. Each ring is resiliently biased by a plurality of biasing members distributed along the annular extension of the ring. In general the biasing members are non-linear. In some embodiments, each biasing member comprises at least two springs arranged in parallel, e.g. two helical springs. In some embodiments the two springs of each biasing member can be coaxial.

According to one embodiment, the biasing member comprises a non-linear, e.g. a progressive, helical spring or is formed by a single non-linear helical spring. In some embodiments, the biasing member comprises a first helical spring and a second helical spring arranged in parallel. Arranged in parallel means that both springs are subject to the same deflection. At least one of said first and second helical springs is non-linear. In advantageous embodiments, both helical springs are non-linear.

In some embodiments, the biasing member comprises a so-called friction spring, or ring spring, comprising a plurality of coaxial conical faced inner and outer ring elements assembled in a columnar form. The ring elements can have identical stiffness. In some embodiments, the ring elements differ by stiffness values.

According to other embodiments the biasing member comprises a plurality of coaxially arranged Belleville springs or so-called disc springs arranged in a columnar form. The coaxially and superposed Belleville springs can be identical to one another or can differ from one another, e.g. their characteristic load-deflection curve can be different from one spring to the other. The stillness of the various disc springs can be selected based on the desired overall load-deflection characteristic curve. The curve can be designed to achieve additional advantages, such as reduction of the impact load and impact wear of the shutter. For this purpose, in some embodiments the disc springs are constructed and arranged such that the stiffness of the biasing member increases with deflection.

According to some embodiments the biasing member can be combined with at least one damper. The damper can be made of a suitable elastomeric material, or composite material, such as a reinforced resin. In other embodiments the damper can also be made of metal.

In particularly advantageous embodiments two dampers are arranged at opposite ends of the biasing member. In some embodiments, the biasing member can comprise a helical spring or a pair of coaxially arranged helical springs, the ends of which are housed in opposing seats of respective dampers. The dampers are constructed and arranged to prevent or limit a radial outward deflection of the resilient member. This causes the friction to increase when the compressive deflection increases, which results in surge mitigation or suppression. This results in a modification of the characteristic of the biasing member. Interaction between the spring and the damper(s) due to radial deflection causes on the one hand energy dissipation and on the other alters the resonance frequency of the spring. Both factors contribute to surge suppression or mitigation. The spring becomes non linear due to the spring-damper interaction.

In other embodiments the dampers are arranged to contact the inner surface of the springs. The interaction between damper and spring in this cases reduces with increasing deflection of the spring, since radial expansion reduces the contact force between the inner surface of the spring and the damper. Also in this case the result is a change in the dynamic behavior of the spring, i.e. a non-linear behavior of the spring.

The modification on the damper/spring interaction due to radial spring deflection modifies the resonance frequency of the spring. Consequently, if a surge compression wave starts to propagate along the spring, once the wave achieves one end of the spring the spring deflection will alter the springy/damper contact forces and modify automatically the resonance frequency of the spring, resulting in surge reduction or suppression.

According to further aspect, the subject matter disclosed herein concerns a reciprocating compressor comprising a cylinder; a piston slidingly arranged and reciprocatingly moving in said cylinder; a suction duct and a discharge duct in fluid communication with said cylinder; at least a suction valve in said suction duct and a discharge valve in said discharge duct; opening and closing of said suction valve and said discharge valve being automatically controlled by a differential pressure across the valve. One or both suction and discharge valves are comprised of a shutter and a biasing member having a non-linear characteristic load-deflection curve.

In some embodiments the compressor is a hyper compressor. In some exemplary embodiments the compressor rotates at between 150 and 300 rpm, i.e. the piston performs 150-300 cycles per minute. Consequently each suction and discharge valve in the compressor perform 150-300 opening and closing cycles per minute. According to some embodiments the compressor operates at a discharge pressure between 800 and 4500 bar, for example between 1500 and 3500 bar.

According to still a further aspect, the subject matter disclosed herein concerns a method for mitigating or suppressing spring surge in a reciprocating compressor valve, comprising the step of using a non-linear biasing member acting on the valve shutter. The non-linearity behavior of the biasing member prevents or reduces resonance compression waves from propagating along the biasing member.

The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 7 illustrates a longitudinal section of a poppet valve in an opened position according to a further exemplary embodiment, using Belleville springs:

FIGS. 8(A) and 8(B) illustrate characteristic load-deflection curves of exemplary embodiments of the biasing member:

FIG. 9A, 10A illustrate exemplary embodiments of Belleville spring arrangements;

FIG. 9B, 10B illustrate the characteristic load-deflection curves of the Belelville spring arrangements of FIGS. 9A, 9B:

FIG. 11 illustrates a further exemplary embodiment of a Belleville spring arrangement;

FIG. 16 illustrates a longitudinal section of a ring valve with non-linear resilient members according to a further embodiment, according to line XVI-XVI in FIG. 16A;

FIG. 16A illustrates a view according to line XVIA-XVIA of FIG. 16;

FIG. 17 illustrates an enlargement of the detail XVII in FIG. 16.

DETAILED DESCRIPTION OF THE EXEMPLARY EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

The following detailed description refers to single poppet valves. It shall however be understood that at least some of the features disclosed herein could be embodied in a multi-poppet valve, i.e. a valve including more than one shutter and relevant shutter guide. For example a valve stop including a plurality of guides for a plurality of poppet shutters can be used in combination with a valve seat with a plurality of suction openings, each corresponding to a respective poppet shutter.

Figure 1:
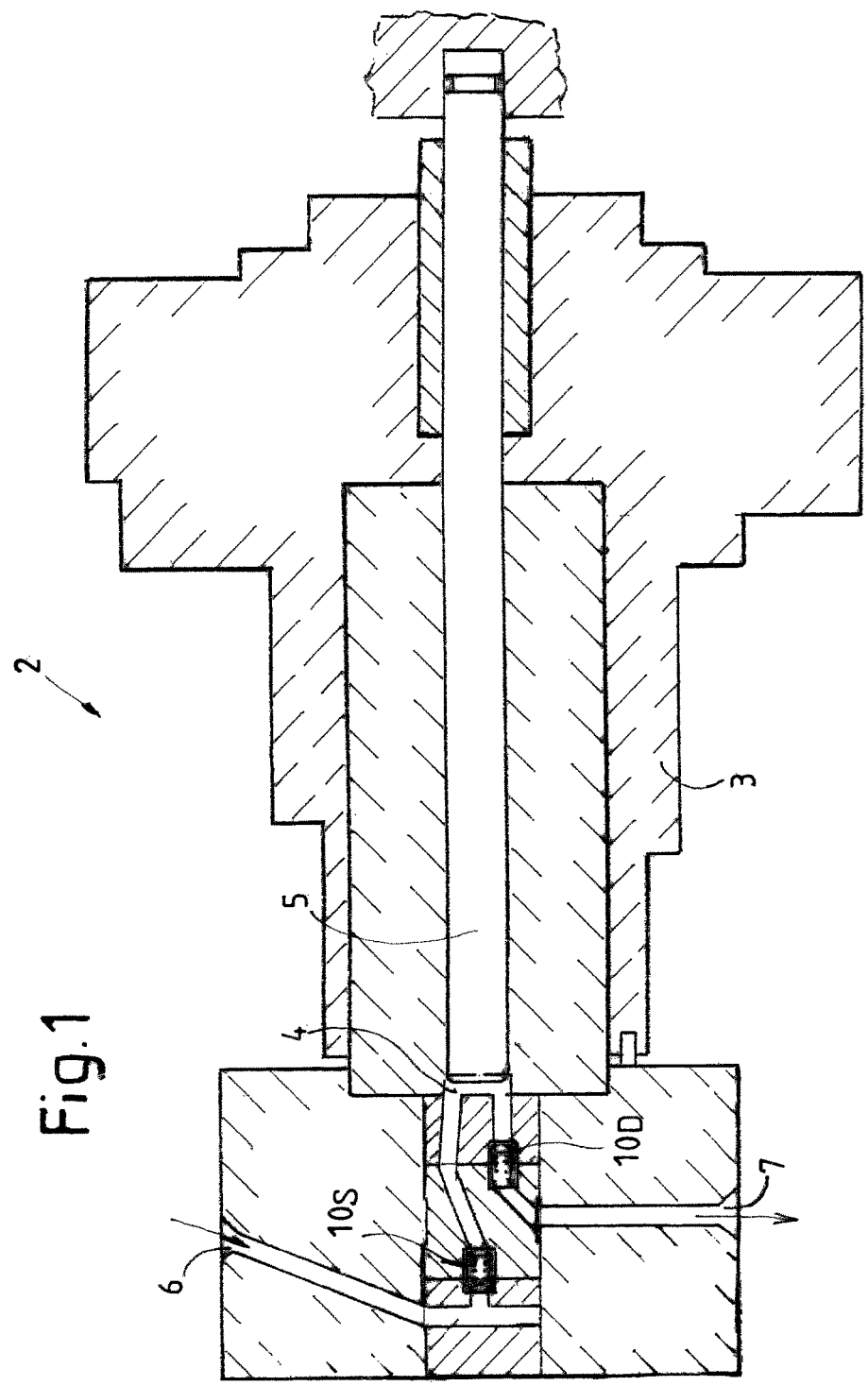
FIG. 1 shows a section of a portion of a reciprocating hyper compressor according to the state of the art.
Figure 2:
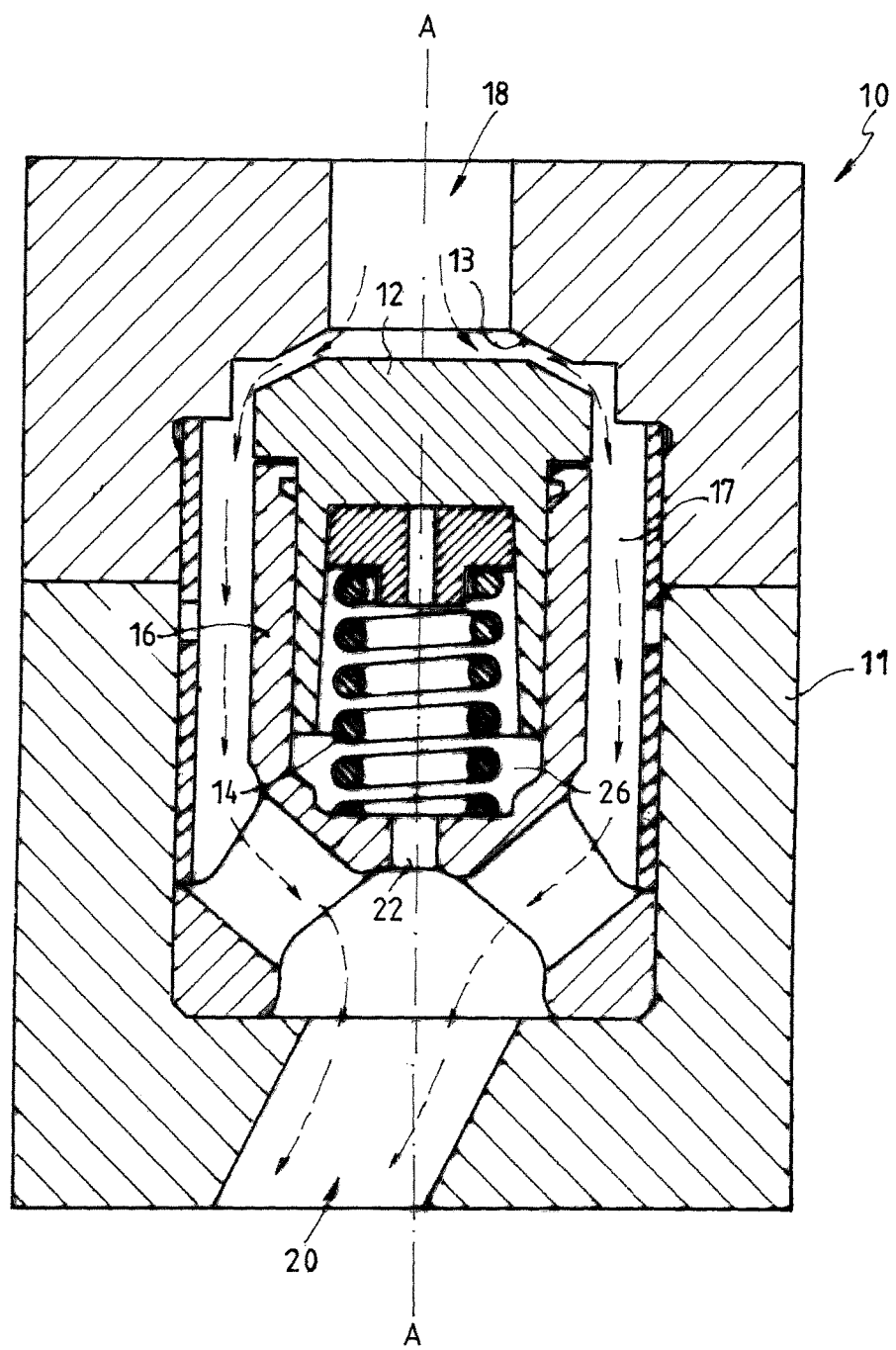
FIG. 2 illustrates a section along a longitudinal axis of a poppet valve for a hyper compressor according to the state of the art.
Figure 3:
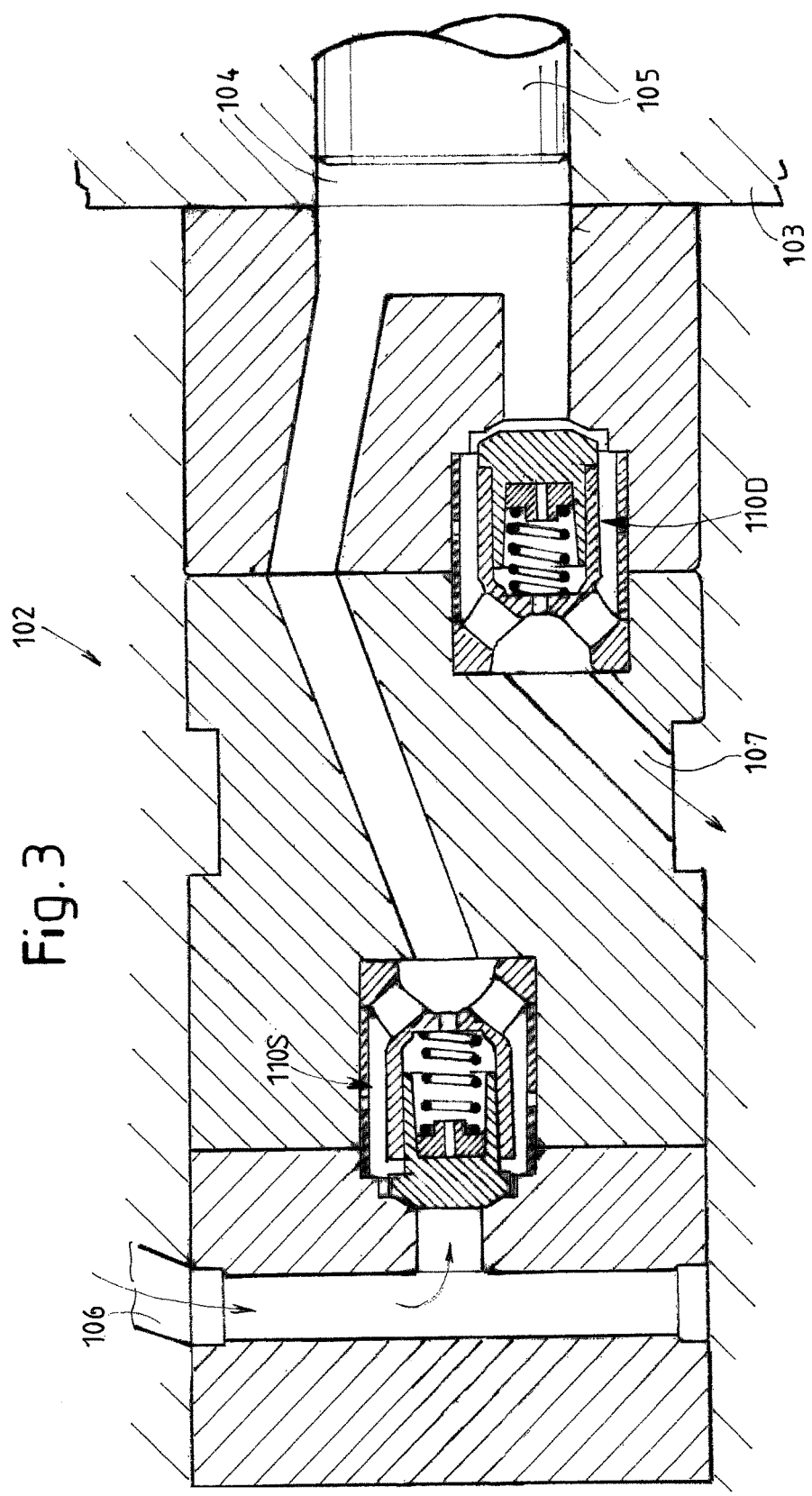
FIG. 3 illustrates a longitudinal section of a portion of a hyper compressor according to an exemplary embodiment.

Referring first to FIG. 3, the general structure of a hyper compressor will be described, limited to those parts which are important for an understanding of embodiments of the invention. The hyper compressor 102 comprises a casing 103 in which a cylinder 104 is formed. A piston rod 105 slides reciprocatingly in the cylinder 104 to suck a fluid from at least one suction duct 106 and discharge the fluid at a higher pressure in at least one discharge duct 107. A respective poppet valve is arranged in each said suction duct 106 and discharge duct 107 respectively. Reference number 110S designates the poppet valve in the suction duct 106 and reference number 110D designates the poppet valve in the discharge duct 107. The arrangement of the suction duct and the discharge duct with respect to the cylinder 104 can be different from that shown in the drawings. In particular, the position of the valve axes with respect to the cylinder axis can be different and can depend upon the design values of the inlet and outlet pressure of the hyper compressor.

The piston rod 105 is actuated by a crank (not shown). In some embodiments the rotary speed of the crank is in the range between 150 and 300 rpm, i.e. the piston rod 105 performs a complete compression-suction movement 150-300 times/minute. Consequently, each valve 110S, 110D performs an opening-closing movement between 150 and 300 times/minute. The discharge pressure of the compressor ranges between 800 and 4000 bar, for example between 1500 and 3500 bar.

Figure 4:
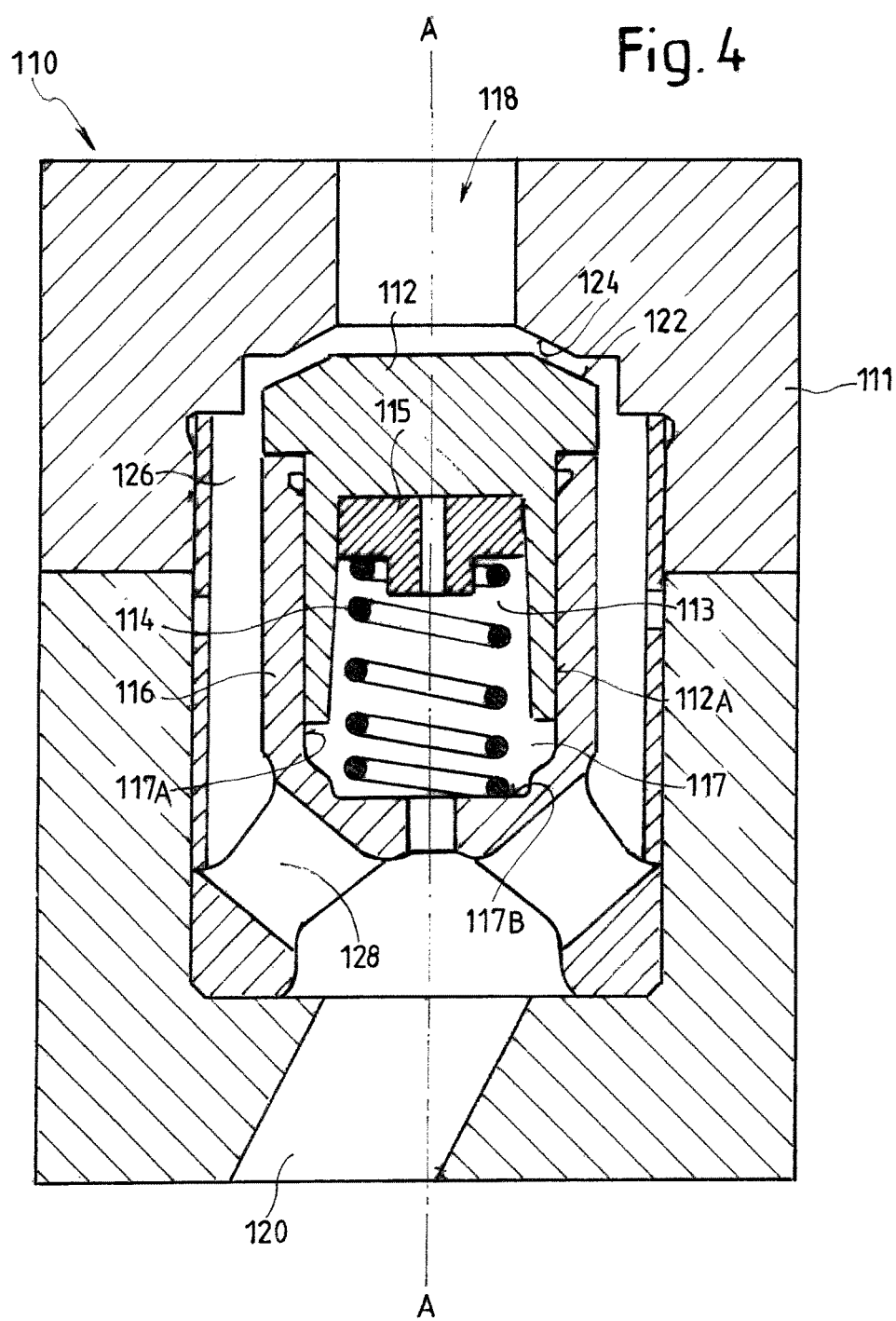
FIG. 4 illustrates a longitudinal section of a poppet valve in an opened position according to an exemplary embodiment.

Each poppet valve 110S, 110D can be designed as illustrated in the exemplary embodiment shown in FIG. 4, where the poppet valve is designated 110 as a whole and is shown in its open position, allowing gas to flow through the valve from the inlet toward the outlet.

The poppet valve 110 includes a valve body 111 having a valve axis A-A, a poppet shutter 112, a biasing member 114 and a shutter guide 116. In the exemplary embodiment shown in FIG. 4 the biasing member 114 comprises a helical compression spring. Different biasing members can be used, instead, as will be discussed later on, reference being made to the remaining figures of the drawings. In some embodiments the poppet shutter 112 has an inner cavity 113 wherein a spacer 115 is disposed. The spring 114 is housed partly in the inner cavity 113 of the poppet shutter 112 and partly in an inner chamber 117 of the shutter guide 116. More specifically, the spring 114 is retained between the spacer 115 and a bottom surface 117B of the inner chamber 117 of the shutter guide 116. The surface 117A of the inner chamber 117 is in sliding contact with the outer surface 112A of the poppet shutter 112, such that the latter is slidingly guided by the shutter guide 116 during opening and closing movement of the poppet shutter 112.

The poppet valve 110 also includes a flow inlet 118 and a flow outlet 120. In operation, the spring 114 biases the shutter 112 away from the shutter guide 116 in a closed position where a portion 122 of a surface of the shutter 112 rests against a closure seat 124 formed by a surface portion of the valve body 111, thereby preventing gas from flowing from the flow inlet 118 to the flow outlet 120 or vice versa. The spring 114 is suitably pre-loaded to provide sufficient closure pressure between the shutter 112 and the closure seat 124. When the force exerted on the shutter 112 by the differential gas pressure across the valve is higher than the biasing force of the spring 114, the shutter 112 is moved to the opened position shown in FIG. 4, thereby allowing gases to flow from the flow inlet 118 to the flow outlet 120 through flow passages 126 formed between the shutter 112 and an inner surface of the valve body 111 as well as between the shutter guide 116 and the inner surface of the valve body 111, as illustrated by the arrows 128 in FIG. 4.

Figure 4A:
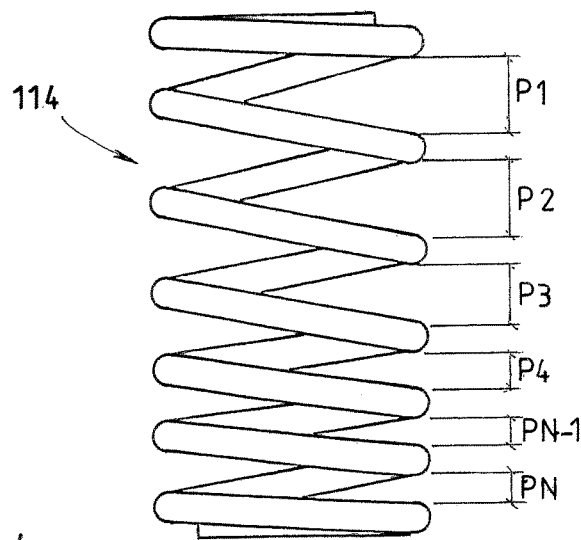
FIG. 4A illustrates a side view of the progressive spring of the valve of FIG. 4.

In the embodiment shown in FIG. 4 the spring 114 is a helical spring or coil spring. Differently from poppet valves of the prior art, however, the spring 114 is not a linear spring but rather a non-linear spring, e.g. a progressive spring. In general terms, a progressive non-linear helical spring can be schematically represented by an arrangement of serially positioned springs having a variable stiffness. In general terms, such an arrangement can be obtained in different manners. In the embodiment shown in FIGS. 4 and 4A this is achieved by a helical spring wherein the pitch between the coils forming the spring varies along the axial extension of the spring, as best seen in the enlargement of FIG. 4A. In the latter the pitches, i.e. the spacing between two adjacent active coils forming the spring 114 are labeled P1, P2, P3, . . . Pn−1, Pn. The pitch can vary stepwise from one end to the opposite end of the spring, though this is not mandatory; for example the pitch can decrease from each spring end towards the spring center or vice-versa.

Figure 4B:
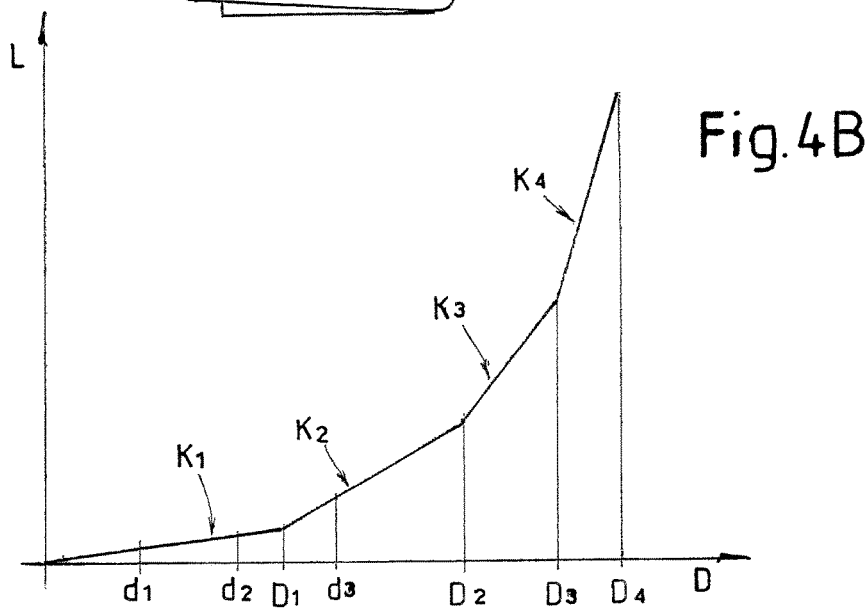
FIGS. 4B and 4C illustrate diagrams showing the characteristics of the progressive spring used in the embodiment of FIG. 4.
Figure 4C:
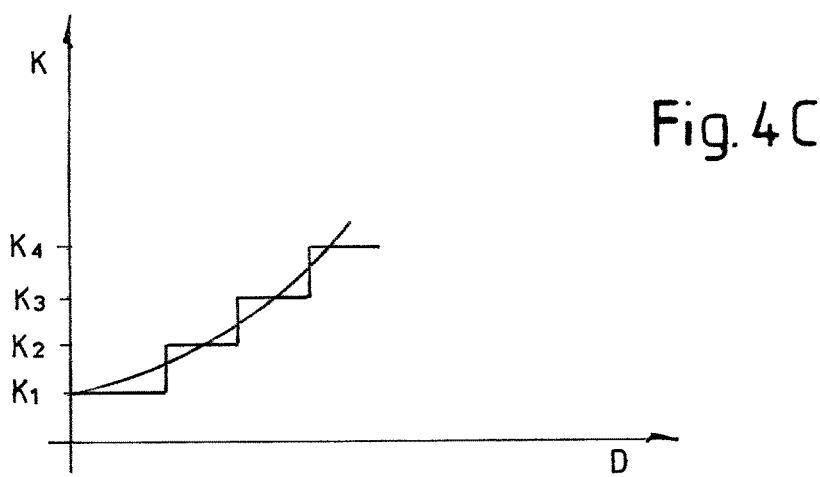

The non-linear, progressive helical spring behavior suppresses or reduces surge phenomena as follows. Theoretically, in a common linear helical spring the total spring deflection is distributed uniformly among the various coils. This means that the distance between each pair of adjacent coils reduces to an identical extent until finally the coils contact each other. In the progressive helical spring the coils which are distanced by the smallest pitch will touch each other earlier than the remaining coils. Once two adjacent coils contact each other, they do not deflect further and subsequent deflection of the spring will be distributed among the remaining, non-contacting coils. This changes the stiffness of the coil. While compressive deflection increases, a progressively larger number of coils contact each other causing a gradual stiffness increase of the spring, until finally the maximum compressive deflection is achieved with each coil contacting the adjacent ones. FIG. 4B shows a load (L) vs. deflection (D) diagram of an exemplary non-linear progressive helical spring. The characteristic curve is composed by a sequence of straight portions having an increasing inclination over the abscissa. $D_1$, $D_2$, $D_3$ and $D_4$ indicate deflection values at which a pair of adjacent coils get in contact due to spring deflection. The derivative of the curve represents the stiffness of the spring. The stiffness increases with increasing deflection. FIG. 4C represents the trend of the stiffness (K) as a function of the spring deflection (D). $K_1$, $K_2$, $K_3$, $K_4$ are the progressively increasing stiffness values of the spring 114.

The spring 114 is pre-loaded and the overall deflection is determined by the stroke performed by the poppet shutter 112 when moving from the closed position to the opened position.

The valve can be designed such that under normal operative conditions the minimum and maximum spring deflections are lower than $D_1$. In this case, referring to FIG. 4B the value $d_1$ on the abscissa represents the deflection of spring 114 in the pre-loaded condition (valve closed) and $d_2$ represents the maximum deflection of the spring 114 when the poppet shutter is open, in the case of absence of surge phenomena. Under these operative conditions the spring will have a normal linear behavior and will never exceed a deflection which causes mutual contact of adjacent spring coils if no surge phenomena arise. Such operating conditions preserve the spring from inter-coil wear.

According to other embodiments the valve can be designed such that under normal operating conditions the spring deflection exceeds the first value $D_1$ and therefore during normal valve operation the spring stiffness varies. In this case, for example, the pre-load deflection (poppet shutter 112 closed) will be $d_2$ and the maximum deflection (poppet shutter 112 open) will be $d_3$. Inter-coil contact and moderate inter-coil wear can occur. However, the valve behavior will be improved from the point of view of dynamic stresses, because the increased spring stiffness from $K_1$ to $K_2$ during the opening stroke will reduce the impact speed of the poppet shutter 112 upon opening of the valve. This will reduce frontal damages and dynamic fatigue stresses of the valve.

In case of surge, the compression wave will be prevented from traveling along the spring due to the non-linear increase of the spring stiffness. Since the stiffness of the progressive spring varies with deflection, the resonance frequency thereof also varies and propagation of compressive waves (spring surge) is suppressed or at least strongly reduced. The stiffness change and resonance frequency change due to progressive, non-linear characteristic of the spring, causes suppression of the propagation of the surge compressive wave.

Figure 5:
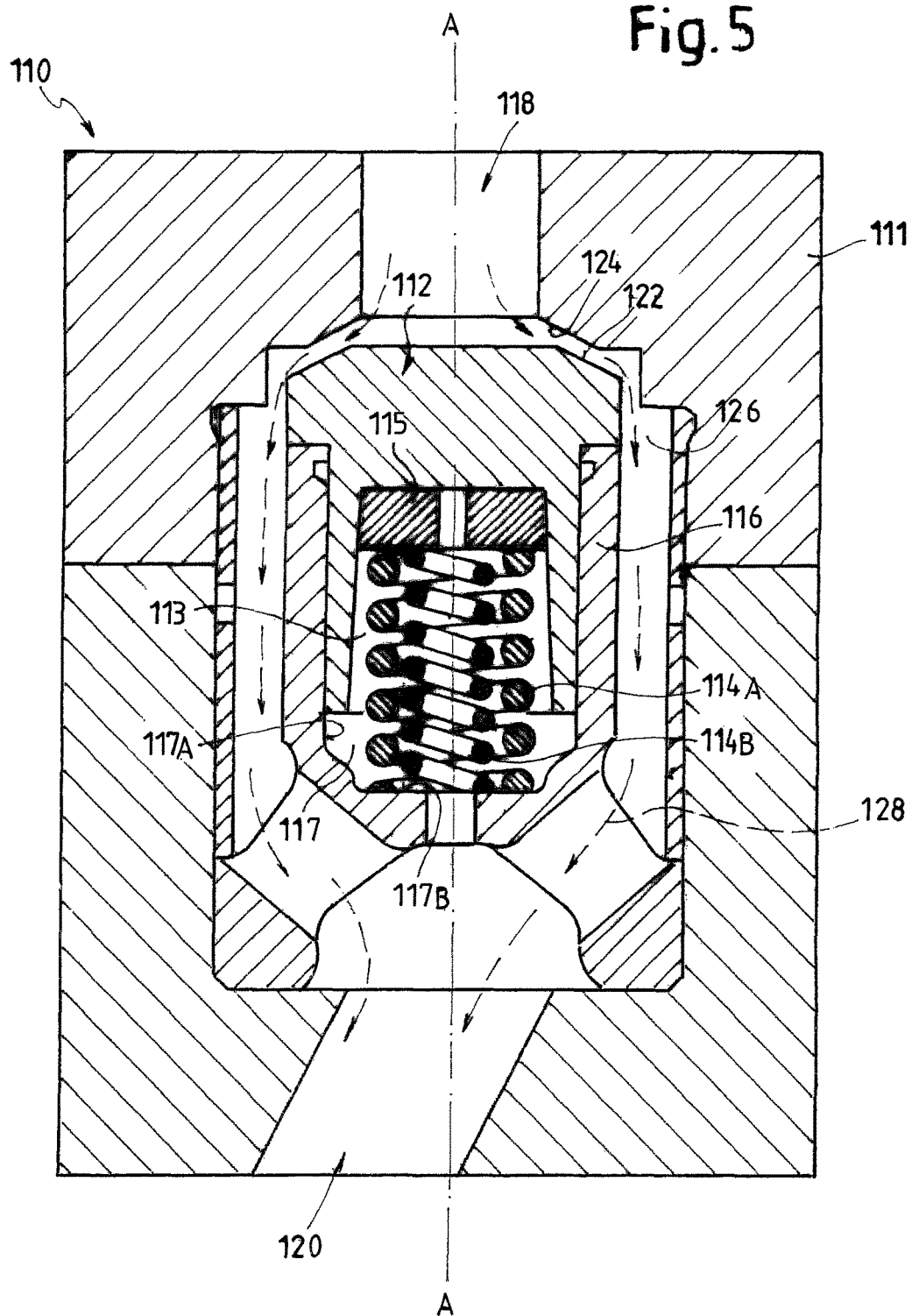
FIG. 5 illustrates a longitudinal section of a poppet valve in an opened position according to another exemplary embodiment.

FIG. 5 illustrates a further exemplary embodiment of the invention. In this embodiment, the general structure of the valve is substantially the same as in FIG. 4 and will not be described in detail again. The poppet valve of FIG. 5 differs from the poppet valve of FIG. 4 because the biasing member 114 comprises two helical springs 114A and 114B in parallel, arranged one inside the other. More specifically, the spring 114A has a larger diameter and is arranged around the smaller spring 114B. The spacer 115 is somewhat differently shaped with respect to the spacer 115 in FIG. 4 to provide sufficient space for the inner spring 114B.

According to some embodiments, at least one of the two springs 114A, 114B is a non-linear spring, e.g. a progressive spring. In some embodiments both springs 114A. 114B are non-linear springs, e.g. progressive springs. As described with respect to FIG. 4, also in the embodiment of FIG. 5 the non-linear behavior of the spring causes surge suppression or surge reduction. Both springs 114A and 114B are suitably pre-loaded.

In some embodiments the springs 114A, 114B are designed such that at least the first resonance frequency (first harmonic) of one of said springs 114A, 114B is different from the first resonance frequency (first harmonic) of the other spring. In some embodiments also at least the frequencies of the second and preferably also of the third and possibly fourth order (second, third, fourth harmonic) are different for the two springs 114A, 114B. For example, if a first spring has a first resonant frequency at 100 Hz and subsequent resonant frequencies at 200, 300, 400 Hz, it is suitable to design the second spring such that neither the first nor the second, third and fourth resonant frequencies thereof are at 100, 200, 300 or 400 Hz.

Figure 6:
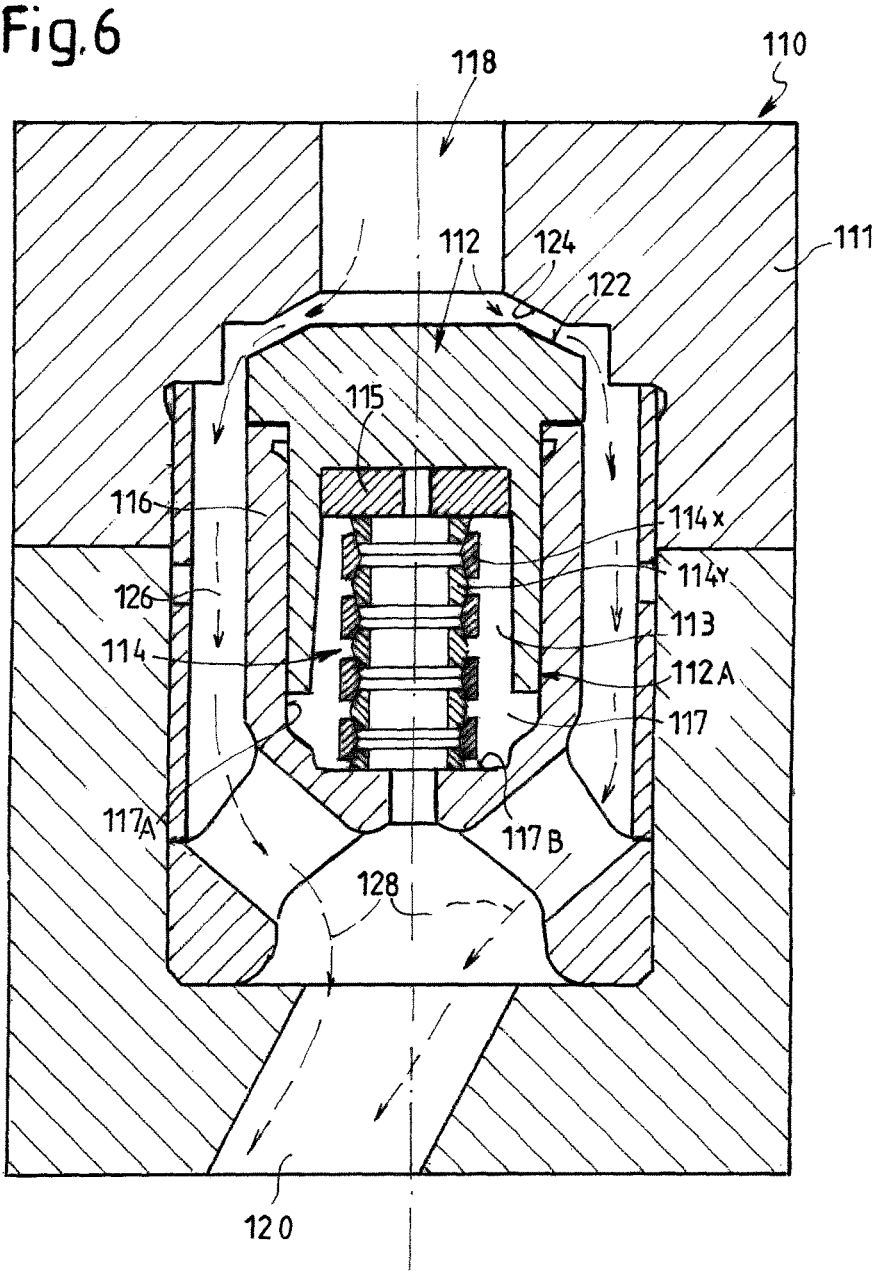
FIG. 6 illustrates a longitudinal section of a poppet valve in an opened position according to yet another exemplary embodiment, using ring springs.
Figure 6A:
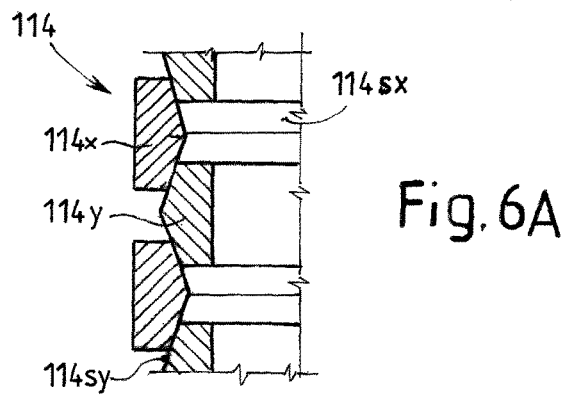
FIG. 6A illustrates an enlargement of the biasing member of the valve of FIG. 6.

FIGS. 6 and 6A illustrate a further embodiment of the invention. The overall structure of the valve 110 is substantially similar to the structure of the valve illustrated in FIGS. 4 and 5. In the embodiment of FIG. 6, however, the biasing member 114 is in the form of a so-called friction spring or ring spring. The friction spring comprises a plurality of elastic ring elements arranged in series and coaxial to one another, in a columnar arrangement. More specifically, the biasing member 114 comprises at least one tension ring element 114X and at least one compression ring element 114Y. In the example shown in FIG. 6, actually a plurality of tension ring elements 114X are combined with a plurality of compression ring elements 114Y. The compression ring elements and tension ring elements are arranged in an alternating manner, a tension ring element 114X following a compression ring element 114Y and so on. Mutually adjacent ring elements are in contact with one another at contacting frustum-conical friction surfaces 114Sx and 114Sy, as best shown in the enlargement of FIG. 6A.

When an axial load is applied to the ring spring 114, the tension ring elements 114X deflect radially outwardly, while the compression ring elements 114Y deflect radially inwardly. Friction is generated at the frustum-conical surfaces of mutual contact 114Sx and 114Sy. The behavior of the ring spring 114, i.e the load-deflection curve thereof is non-linear. In addition, the friction at the frustum-conical friction surfaces 114Sx, 114Sy generates a damping died. Both factors mitigate or suppress surge phenomena which may arise during operation of the valve.

The behavior of the ring spring is non-linear per se and self-dampening. As noted, both features contribute to spring surge reduction or suppression. In some embodiments, an additional non-linearity factor can be introduced by varying the stiffness of the ring elements 114X, 114Y forming the ring spring or friction spring 114. In some embodiments ring elements with variable stiffness are used to obtain a more advantageous load-deflection curve as will be discussed in more detail here below.

FIG. 7 illustrates a longitudinal section of a poppet valve in a further embodiment. The valve is shown in the open position. The overall structure of the valve is similar to that already described in detail in connection with FIG. 4 and will not be described again. The valve 110 of FIG. 7 differs from the valve of FIG. 4 mainly because the biasing member 114 is formed by a series of disc springs, also known as Belleville springs, in a columnar arrangement, each spring being designated 114Z. Each disc spring 114Z is formed by a conically shaped resilient disc element. In some embodiments the Belleville springs are solid. In other embodiments slotted Belleville springs can be used. It is also possible to combine slotted and non-slotted disc springs in the same set of Belleville springs, e.g. to obtain a desired load-deflection curve of the springs set.

Belleville springs are non-linear. Their stiffness varies with the degree of deflection. Additionally, a biasing member formed by a plurality of superposed Belleville springs is self-damping. Adjacent and superposed Belleville springs are in contact along friction contacting surfaces. Deformation of the springs under load generates friction between contacting surfaces with a consequent damping effect.

A non-linear behavior of the biasing member formed by the set of Belleville springs 114Z contributes to spring surge suppression or mitigation since the compression wave cannot propagate along the series of springs 114Z as stiffness and resonance frequency vary with deflection. As noted above with respect to non-linear, progressive helical springs, as well as in the case of friction springs, also in the case of a plurality of Belleville or disc springs the compression wave triggered by surge is prevented from propagating along the biasing member due to the instant change in resonance frequency caused by the stiffness modification. Moreover, the self damping feature of the springs additionally contributes to surge suppression or reduction.

The load-deformation characteristic of a set of Belleville springs can be adapted according to needs, e.g. using Belleville springs 114Z having different stiffness values and/or by suitably orienting the springs. FIGS. 8(A) and 8(B) illustrate two different trends of a load-deflection curve of different Belleville spring sets 114. Load is plotted on the vertical axis and deflection is plotted on the abscissa. In FIG. 8(A) the spring set is characterized by a decreasing stiffness with increasing deflection. In FIG. 8(B) the spring stiffness increases when the deflection increases. This last spring behavior is currently preferred in some circumstances, because a reduction of impact stress and consequent impact damage is achieved.

An increasing stiffness is a generally desirable feature also when a different kind of non-linear spring, e.g. a ring-spring or friction spring, or a non-linear helical spring is used.

Similar force-deformation curves can be obtained also by means of a ring-spring as shown in FIGS. 6, 6A, when rings of variable stiffness are used in combination.

In some embodiments increasing stiffness of the columnar arrangement of Belleville springs can be obtained by suitable selection and design of the various springs. FIG. 9A schematically illustrates a possible arrangement of Belleville springs designed to achieve an increasing stiffness of the resilient member formed by the springs. FIG. 9B diagrammatically illustrates the characteristic curve of the spring assembly of FIG. 9A. The Belleville springs 114Z of FIG. 9A have a variable thickness. The spring thickness increases from a first portion x to a second portion y and from said second portion v to a third portion z. When the load applied on the spring increases, all springs in the x-portion will deflect to a larger extent and will first become flat (condition of maximum deflection). This causes stiffness increase: further deflection due to load increase will be concentrated on the springs of the y- and z-portions only. The springs of the y-portion will reach maximum deflection first and therefore continued load increase will cause deflection of only the remaining springs in the z-portion of the Belleville spring pack. An additional stiffness increase is thus obtained. In FIG. 9B the characteristic curve has three sections labeled x+y+z, v+z and z respectively. In the first section all three portions x, y and z will contribute to deflection, in the y+z section only the springs in the y- and z-portion will deflect. Finally, in the z-section the spring stiffness increases further and only the springs in the z-portion will deflect. Each section of the curve is approximately linear, but the overall trend of the characteristic curve has an increasing steepness due to increased stiffness of the spring arrangement.

FIG. 10A shows a different embodiment of a Belleville spring arrangement which has a similar behavior. FIG. 10B shows the corresponding characteristic curve. Same references indicates corresponding features as in FIGS. 9A, 9B. While in FIG. 9A variable stiffness is obtained with Belleville springs of variable thickness, in FIG. 10A variable stiffness is obtained by arranging a different number of Belleville springs in parallel in each portion of the Belleville spring column.

Similar results can be achieved by using identical Belleville springs but interposing there between spacer rings 114R of variable height, as shown in FIG. 11. The deformation of the springs beyond a given extent is prevented by the springs abutting against the corresponding interposed spacer ring 114R. Since the height of the spacer rings 114R is variable, the degree of free deflection for the various Belleville springs is not identical. A non-linear behavior is obtained.

In some embodiments, non-linearity can be achieved also using a combination of different kinds of springs arranged in series or in parallel, e.g. a helical spring combined with one or more Belleville springs, or else a combination of Belleville and ring springs, or a combination of ring springs and Belleville springs.

Figure 12:
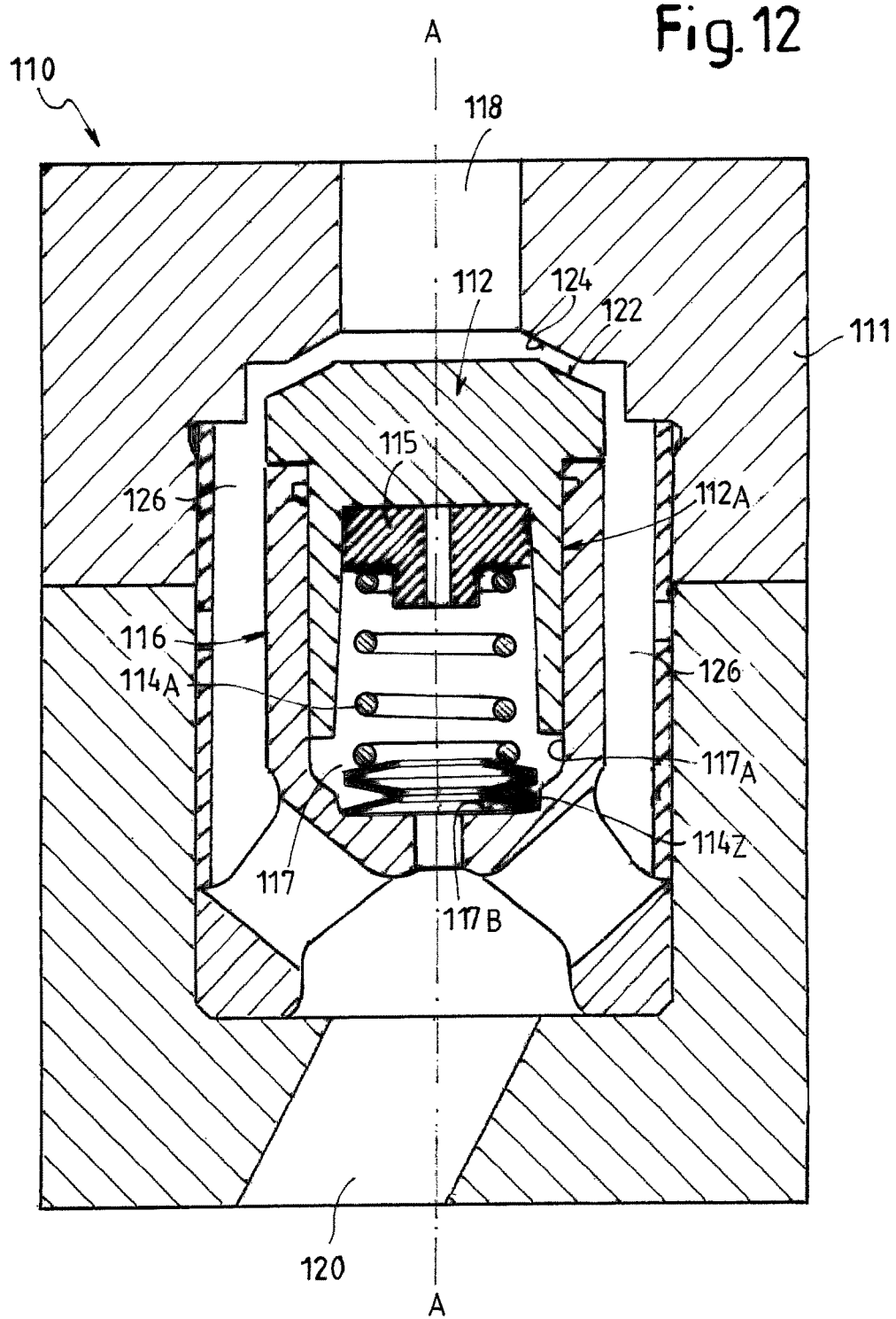
FIG. 12 illustrates a longitudinal section of a poppet valve using a hybrid spring combination.

FIG. 12 schematically shows an exemplary embodiment of a poppet valve comprising a biasing member 114 formed by combined helical spring 114A in series with a set of serially arranged Belleville springs 114Z. The helical spring can be a non-linear, progressive spring.

Figure 13:
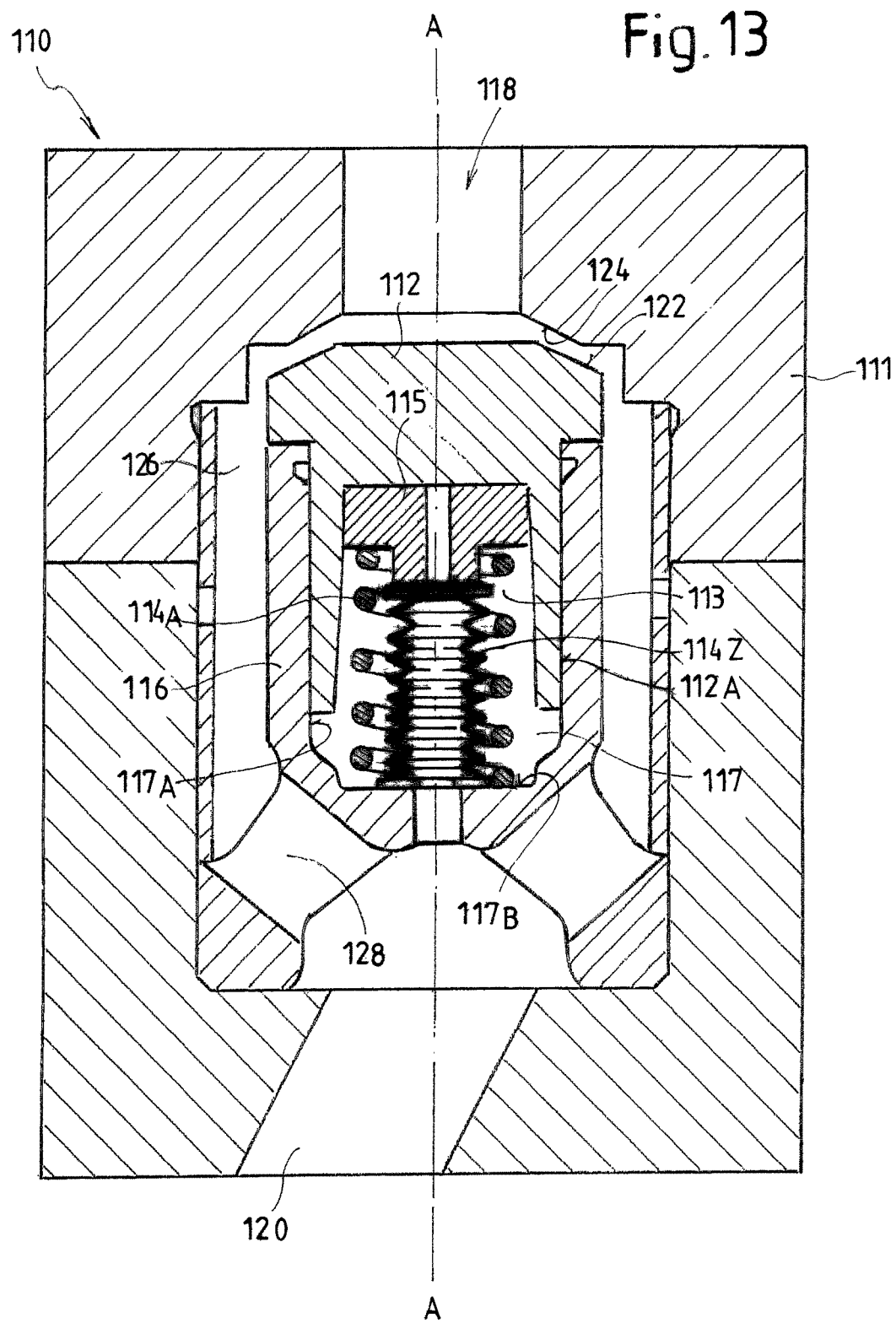
FIG. 13 illustrates a longitudinal section of a poppet valve according to a further exemplary embodiment including a Belleville spring arrangement in parallel to a helical spring.

FIG. 13 illustrates an embodiment of a poppet valve comprising a biasing member 114 comprised of a helical spring 114A in parallel to a set of Belleville springs 114Z. The helical spring 114A can be a linear spring or a non-linear, progressive spring. The Belleville springs 114Z can be arranged for example to obtain a non-linear spring as disclosed in connection with FIG. 7, 8, 9, 10 or 11.

When a resilient member is used, which has an increasing stiffness, such as e.g. a progressive helical spring (FIGS. 4-4C) or a non-linear set of Belleville springs (FIGS. 7-11) or a combination thereof, the springs can be designed such that the stiffness increases stepwise by at least three different steps, i.e. such that the load-deflection curve has at least two knick points where the steepness of the curve varies with a discontinuity of the derivative thereof in the deflection range involved. The discontinuity corresponds to a stiffness change of the spring. Moreover, in some embodiments the ratio between two subsequent stiffness values is preferably comprised between 1.2 and 2, i.e.

$$1.2 < K_i/K_{i-1} < 2$$

where $K_i$ and $K_{i-1}$ are subsequent stiffness values of the spring.

Figure 14:
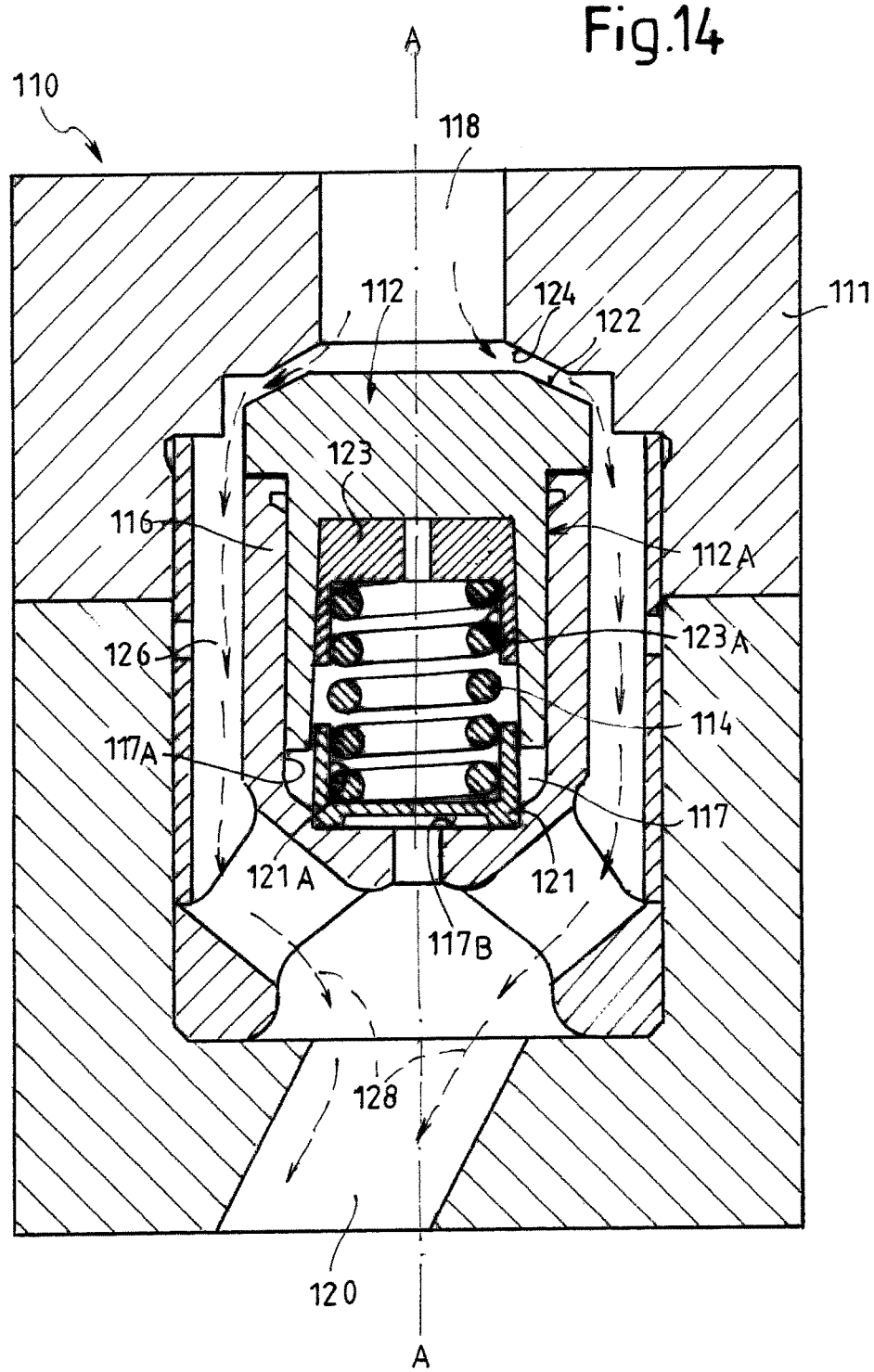
FIGS. 14 and 15 illustrate a longitudinal section of a poppet valve in an opened position according to additional further exemplary embodiments of the invention.

According to a further embodiment, surge mitigation or suppression can be achieved by a combination of a biasing member and a damper arrangement. FIG. 14 illustrates a poppet valve 110 with a biasing member 114 combined to a damper arrangement. The valve 110 of FIG. 14 differs from valve 110 in FIG. 4 because the biasing member 114, in this case again a helical spring, is combined with two damper members 121, 123. The damper member 123 replaces the spacer 115. Each damper member 121 and 123 is generally cup-shaped and forms a seat for a respective end portion of the helical spring 114. Reference 121A indicates the seat formed by damper member 121, housing a lower portion of the helical spring 114 and reference 123A indicates the seat formed by the damper member 123, housing the upper portion of the helical spring 114. The helical spring 114 can be a linear spring or else a non-linear, progressive spring.

When subject to compressive load the helical spring deforms axially but also radially. The axial extension is reduced and the coils tend to deform radially outwardly. In some embodiments each seat 121A, 121B is designed such that some degree of clearance exists between the spring coils and the inner surface of each seat 121A, 121B. The spring can freely deflect radially outwardly to some extent when axially compressed without interfering with the seats 121A, 121B of the damper members 121, 123. Beyond a certain axial deflection, however, the increase of the radial dimension of the coils is such that the coils contact the inner surfaces of the seats 121A, 121B. Further progressive deflection causes friction between the spring coils and the seats 121A, 123A of the damper members 121, 123. The damper members 121, 123 can be made of elastically deformable material with a high coefficient of friction, e.g. an elastomeric material or a composite material, which will elastically oppose the radial outward deflection of the spring coils and generate friction opposing further axial compression of the spring. In other embodiments metallic dampers can also be used.

A damping effect is thus obtained. A deformation wave induced by surge causes a local deflection of the spring, which goes beyond normal deflection under correct operation under design conditions. Such deformation is opposed by the damper members 121, 123. Friction causes energy dissipation and also a change in the resonance frequency of the spring. The propagation of the compression wave caused by surge is hindered or suppressed.

In some embodiments, initial clearance between the coils of spring 114 and inner surfaces of the seats 121A, 123A of the damper members 121, 123 can be dispensed with. In this case the damper members 121, 123 will oppose radial and thus axial deformation of the spring 114 also when no surging phenomena are present. In such case tolerances in the manufacturing of the damper members 121, 123 are less stringent but the valve will be subject to energy losses, which will result in a reduction of the compressor efficiency. The friction effect increases due to radial expansion of the coils and consequent increased interference between the coils and the side walls of the damper seats 121A, 123A.

Damper members can be used also in combination with other kinds of springs, e.g. Belleville springs, to combine the damping action of the damper member with the intrinsic non-linear behavior and intrinsic damping action of such kind of springs.

Figure 15:
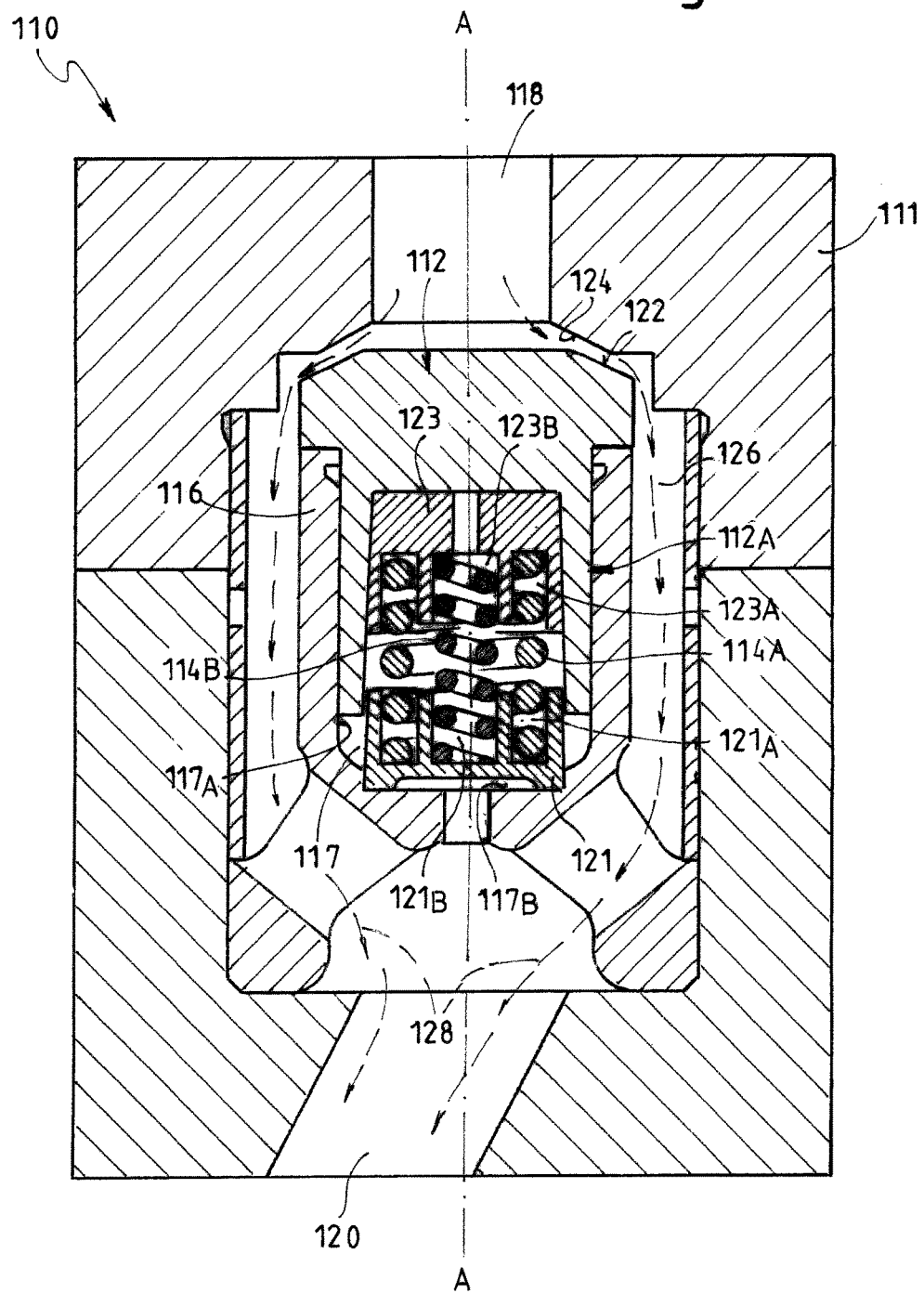

In some embodiments, more than just one helical spring can be used in combination with one or more damper members. FIG. 15 illustrates an exemplary embodiment where two helical springs in parallel are combined with two damper members. The same reference numbers are used to indicate the same or similar elements as in the previous embodiments, and specifically the embodiment of FIG. 14. The biasing member comprises a first helical spring 114A and a second helical spring 114B. In some embodiments, the helical spring 114B has coils with an outer diameter smaller than the inner diameter of the coils of the spring 114A, such that helical spring 114B is arranged inside helical spring 114A without mutual contact there between. In some embodiment one, the other or both of said springs 114A, 114B can be a non-linear, progressive spring as disclosed in connection to FIGS. 4, 4A. The two springs 114A, 114B have usually different resonance frequencies and different stiffness values.

Each damper member 121, 123 is provided with respective two seats for the two springs 114A, 114B. More specifically the damper member 121 comprises an outer annular seat 121A in which terminal coils of outer helical spring 114A are housed. The damper member 121 further comprises a cylindrical seat 121B, coaxial to seat 121A, in which terminal coils of the inner helical spring 114B are housed. Similarly, the damper member 123 comprises an outer annular seat 123A for the end coils of the helical spring 114A, and an inner cylindrical seat 123B where the end coils of the inner helical spring 114B are housed.

In some embodiments each seat 121A, 121B, 123A, 123B and the relevant helical springs 114A, 114B are designed such that an initial clearance is maintained between the coils of each helical spring 114A, 114B and the inner surfaces of the corresponding seats 121A, 121B, 123A, 123B. The clearance can be such that in case surge phenomena arise, the radial outward deflection of the spring coils causes interference between the spring coils and the seats. This generates friction and dissipates energy, and additionally modifies the resonance frequency of the spring arrangement, thus preventing or opposing propagation of the compression wave and eventually suppress or mitigate surge phenomena. The use of non-linear helical springs 114A, 114B or at least one non-linear spring will further reduce surge phenomena. Using two springs 114A, 114B having different resonance frequencies additionally contributes to surge suppression.

According to other embodiments the valve is a ring valve, such as an automatic ring valve for reciprocating compressors. Each ring is resiliently biased by a plurality of biasing members distributed along the annular extension of the ring. In general the biasing members are non-linear. In some embodiments, each biasing member comprises at least two springs arranged in parallel, e.g. two helical springs. In some embodiments the two springs of each biasing member can be coaxial.

FIGS. 16, 16A and 17 illustrate a further embodiment in the form of a ring valve. In this embodiment, a ring valve is designated 201 as a whole. The valve 201 comprises a valve body comprised of a valve stop 203, provided with annular through passages 205, and a valve seat 207 provided with annular through passages 209. Shutters in the form of concentrically disposed sealing rings 212 are arranged between the stop 203 and the seat 205. Each ring 212 is resiliently biased against the seat 207 by a plurality of biasing members 214 disposed along the annular development of the ring. Each biasing member 214 is housed in a housing 213 formed in the valve stop 203. According to some embodiments (see in particular FIG. 17) each biasing member 214 comprises at least two springs 214A. 214B. Each spring 214A, 214B can be a helical spring. In the embodiment disclosed in the drawings the springs 214A, 214B are coaxial, i.e. the smaller one is arranged in the empty space formed by the larger one of said springs. In some embodiments both springs 214A, 214B are linear helical springs. In alternative embodiments, one or both helical springs are non-linear, e.g. progressive springs. In other embodiments, not shown, each biasing member 114 can comprise more than two springs. In further embodiments, each biasing member 114 can comprise a set of Belleville springs 114Z or a combination of helical springs 114A and Belleville springs 114Z in series or in parallel. In further embodiments ring springs can be used, alone or in combination with helical or Belleville springs.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A differential pressure valve comprising:
   a valve body, the valve body comprising at least one flow inlet and one flow outlet;
   at least one shutter, the shutter being movable between an open position and a closed position under a differential pressure across the valve;
   at least one flow passage from the flow inlet to the flow outlet;
   at least one biasing member configured to bias the shutter towards a closed position so as to block the flow passage through the flow inlet, wherein the biasing member comprises a first non-linear helical spring and a second non-linear helical spring arranged in parallel;
   at least one shutter guide fixedly arranged inside the valve body, the shutter being slidingly guided by the shutter guide; and
   a flow passage from the flow inlet to the flow outlet, the flow passage being formed between an inside surface of the valve body and an outside surface of the shutter guide and of the shutter, wherein the biasing member is housed at least partially in the shutter guide.

2. The valve according to claim 1, wherein the first non-linear helical spring and the second non-linear helical spring are arranged coaxially to one another and one inside the other.

3. The valve according to claim 1, wherein the biasing member is constructed and arranged such that a stiffness thereof increases as a deflection of the biasing member increases.

4. The valve according to claim 3, wherein the biasing member has a load-deflection curve which comprises contiguous substantially linear portions, the stiffness increasing from one portion to a subsequent portion with increased deflection.

5. The valve according to claim 4, wherein the load-deflection curve has at least three points of stiffness discontinuity.

6. The valve according to claim 5, wherein a ratio of the stiffness of the biasing member in two contiguous tracts of the load-deflection curve is comprised between 1.2 and 2.

7. The valve according to claim 1, comprising at least one damper combined to the biasing member.

8. The valve according to claim 7, wherein: the at least one damper comprises a seat; the biasing member is at least partly arranged in the seat; the damper being configured and arranged to contrast radial expansion of the biasing member.

9. The valve according to claim 7, comprising a first damper and a second damper arranged at opposite ends of the biasing member.

10. The valve according to claim 9, wherein: each of the first damper and the second damper comprises a seat; the biasing member is at least partly arranged in the seat of the first damper and at least partly arranged in the seat of the second damper; the first damper and the second damper being configured and arranged to contrast radial expansion of the biasing member.

11. The valve according to claim 1, wherein the shutter is a ring shutter resiliently biased by a plurality of non-linear biasing members arranged along an annular development of the ring shutter.

12. The valve according to claim 1, wherein:
    the shutter is a poppet shutter.

13. A reciprocating compressor comprising:
    a cylinder;
    a piston slidingly arranged and reciprocatingly moving in the cylinder;
    a suction duct and a discharge duct in fluid communication with the cylinder;
    at least one suction valve in the suction duct and a discharge valve in the discharge duct, wherein opening and closing of the suction valve and the discharge valve are automatically controlled by a differential pressure across the valve, and
    wherein the suction valve and the discharge valve are differential pressure valves according to claim 1.

14. A differential pressure poppet valve comprising:
a valve body, the valve body comprising at least one flow inlet and one flow outlet;
at least one shutter guide fixedly arranged inside the valve body;
at least one poppet shutter slidingly guided by the shutter guide;
a flow passage from the flow inlet to the flow outlet, the flow passage being formed between an inside surface of the valve body and an outside surface of the shutter guide and of the poppet shutter;
at least one biasing member at least partially housed in the shutter guide and configured to bias the poppet shutter towards a closed position so as to block the flow passage through the flow inlet, wherein the biasing member comprises a first non-linear helical spring and a second non-linear helical spring arranged in parallel;
a surge-suppression arrangement configured to suppress or mitigate surge phenomena in the biasing member.

15. A method for mitigating or suppressing spring surge in a differential pressure valve, the method comprising:
providing the differential pressure valve, wherein the differential pressure valve is a poppet valve comprising:
a valve body, the valve body comprising at least one flow inlet and one flow outlet;
at least one shutter, the shutter being movable between an open position and a closed position under a differential pressure across the valve;
a flow passage from the flow inlet to the flow outlet;
at least one biasing member configured to bias the shutter towards a closed position so as to block the flow passage through the flow inlet, wherein the biasing member comprises a first non-linear helical spring and a second non-linear helical spring arranged in parallel;
at least one shutter guide fixedly arranged inside the valve body, the shutter being slidingly guided by the shutter guide; and
a flow passage from the flow inlet to the flow outlet, the flow passage being formed between an inside surface of the valve body and an outside surface of the shutter guide and of the shutter, wherein the biasing member is housed at least partially in the shutter guide; and
suppressing a propagation of resonance compression waves in the biasing member by a non-linear deflection of the biasing member.

16. A method for operating a reciprocating compressor, the compressor comprising a cylinder, a piston sliding in the cylinder, a suction duct with a suction valve and a discharge duct with a discharge valve, each valve comprising at least one shutter, the method comprising:
providing for each shutter at least one non-linear biasing member configured to bias the shutter toward a closed position, wherein the at least one non-linear biasing member comprises a first non-linear helical spring and a second non-linear helical spring arranged in parallel;
reciprocatingly moving the piston in the cylinder to suck a gas in the cylinder at a suction pressure and discharge the gas from the cylinder at a discharge pressure; and
selectively opening and closing the suction valve and the discharge valve by differential pressures across the valves.

17. The method according to claim 16, wherein the compressor is operated at between 150 and 300 rpm.

18. The method according to claim 16, wherein the discharge pressure is between 800 and 4500 bar and preferably between 1500 and 3500 bar.

* * * * *